(12) United States Patent
Weaver

(10) Patent No.: US 10,993,423 B1
(45) Date of Patent: May 4, 2021

(54) FISHING LURE COMPRISING ONE OR MORE EXTERNAL RINGS

(71) Applicant: Russell Weaver, Holly Ridge, NC (US)

(72) Inventor: Russell Weaver, Holly Ridge, NC (US)

(*) Notice: Subject to any disclaimer, the term of this patent is extended or adjusted under 35 U.S.C. 154(b) by 0 days.

(21) Appl. No.: 16/776,912

(22) Filed: Jan. 30, 2020

(51) Int. Cl.
 *A01K 85/08* (2006.01)
(52) U.S. Cl.
 CPC .................................... *A01K 85/08* (2013.01)
(58) Field of Classification Search
 CPC ................................ A01K 85/00; A01K 85/08
 See application file for complete search history.

(56) References Cited

U.S. PATENT DOCUMENTS

| | | | | |
|---|---|---|---|---|
| 1,336,227 A * | 4/1920 | Hayes | ................... | A01K 85/08 43/42.27 |
| 1,682,710 A * | 8/1928 | Pflueger | ................. | A01K 85/10 43/42.13 |
| 1,851,529 A * | 3/1932 | Stapf | ..................... | A01K 85/08 43/42.25 |
| 2,165,734 A * | 7/1939 | Stracener | ............... | A01K 85/08 43/42.27 |
| 2,618,094 A * | 11/1952 | Shindler | ................ | A01K 85/08 43/42.24 |
| 3,253,363 A * | 5/1966 | Steehn | ................... | A01K 85/00 43/42.13 |
| 3,848,353 A * | 11/1974 | McClellan | ............ | A01K 85/01 43/42.31 |
| 4,209,932 A * | 7/1980 | Pate | ........................ | A01K 85/00 43/42.11 |
| 4,791,750 A | 12/1988 | Gammill | | |
| 4,930,249 A * | 6/1990 | Johns | ..................... | A01K 83/00 43/42.25 |
| 5,001,856 A | 3/1991 | Gentry | | |
| 5,070,639 A | 12/1991 | Pippert | | |
| 5,226,268 A * | 7/1993 | Sisson, Jr. | ............. | A01K 85/00 43/42.11 |
| 5,412,899 A * | 5/1995 | Reboul | .................. | A01K 85/00 43/42.11 |
| 5,412,901 A * | 5/1995 | Matinez | ................. | A01K 91/06 43/42.19 |
| 5,499,471 A | 3/1996 | Foutch | | |
| 5,524,378 A | 6/1996 | Hood | | |
| 6,158,162 A * | 12/2000 | Loniello | ................ | A01K 85/00 43/42.11 |
| 6,199,312 B1 * | 3/2001 | Link | ...................... | A01K 85/01 43/42.24 |
| 6,233,864 B1 | 5/2001 | Mathews | | |
| 6,598,336 B2 * | 7/2003 | Link | ...................... | A01K 85/00 43/42.24 |

(Continued)

*Primary Examiner* — Michael H Wang
(74) *Attorney, Agent, or Firm* — Ashley D. Johnson; Dogwood Patent and Trademark Law

(57) ABSTRACT

The presently disclosed subject matter is generally directed to a fishing lure for use in attracting and catching fish. Particularly, the lure includes a lure head defined by a main body, a neck, and a connector. The main body includes a rounded first end that allows the lure to easily move through the water. The main body also includes a second end that is operably connected to the neck. The neck houses a plurality of rings that circumferentially surround the neck. In use, the rings make noise as the lure moves through the water. A skirt attaches to the connector and provides an additional attraction for fish. The lure is therefore designed to attract fish by sight and sound senses.

20 Claims, 11 Drawing Sheets

(56) References Cited

U.S. PATENT DOCUMENTS

| | | | | |
|---|---|---|---|---|
| 7,146,764 B1* | 12/2006 | Naumovitz | ............ | A01K 85/01 43/42.31 |
| 7,360,335 B2* | 4/2008 | Edwards | ................ | A01K 85/00 43/42.13 |
| 7,874,094 B2* | 1/2011 | Brevig | ................... | A01K 85/12 43/42.11 |
| 8,402,687 B1* | 3/2013 | Jarrell | ................... | A01K 85/01 43/42.28 |
| 8,640,378 B2* | 2/2014 | Rye | ....................... | A01K 85/01 43/42.09 |
| 9,655,353 B1* | 5/2017 | Hudson | ................... | A01K 85/18 |
| 10,278,376 B2* | 5/2019 | Caraballo, Sr. | ........ | A01K 85/08 |
| 2004/0181993 A1* | 9/2004 | Barbary | ................. | A01K 85/00 43/42.06 |
| 2007/0283613 A1 | 12/2007 | Woller | | |
| 2008/0104878 A1 | 5/2008 | Woller, Sr. | | |
| 2010/0229454 A1 | 9/2010 | Cunningham | | |
| 2011/0185622 A1* | 8/2011 | Somogyi | ................ | A01K 85/00 43/42.06 |
| 2015/0289492 A1* | 10/2015 | Walsh | ................... | A01K 97/00 43/44.9 |
| 2020/0060248 A1* | 2/2020 | Choate | .................. | A01K 85/08 |

\* cited by examiner

FISHING LURE COMPRISING ONE OR MORE EXTERNAL RINGS

TECHNICAL FIELD

The presently disclosed subject matter relates generally to the field of fishing lures, and in particular, to fishing lures comprising one or more external rings that generate fish-attracting noises.

BACKGROUND

In recent years, fishing has evolved into a huge industry, with millions of dollars spent annually on boats, tackle, and lures. As a result, many devices have been developed to improve the chance of successfully catching fish. For example, it is well known that many species of fish are attracted to sound waves and vibrations. Therefore, lures have been developed that produce a rattling noise as they travel through the water. However, many prior art lures that include noise-making features include one or more pellets internal to the lure. Because the rattle mechanism is housed within the lure, the noise has a limited range and therefore reaches a relatively small number of fish. Alternatively, prior art lures have been developed that have one or more rattles mounted to an exterior surface, such as on the underside or top of the lure. Even though these lures produce louder noises when compared to internal-rattle lures, the rattles can become dislodged or lost due to contact with one or more items (a fish, movement of water, etc.). It would therefore be beneficial to provide a fishing lure with noise-making capabilities that overcomes the shortcomings of the prior art.

SUMMARY

In some embodiments, the presently disclosed subject matter is directed to a fishing lure comprising a main body, a connector, a neck, and one or more rings. The main body is defined by an external diameter, a first end, and a second end. The connector is configured for attachment of a lure skirt, and is defined by an external diameter, a first end, and a second end. The neck is defined by an external diameter, a first end, and a second end, wherein the neck first end is operably joined to the second end of the main body, and wherein the neck second end is operably joined to the first end of the connector. The rings are positioned about the external diameter of the neck, wherein each ring is defined by a central aperture with a diameter that is greater than the external diameter of the neck, and less than the external diameter of the main body and the connector such that the rings are maintained on the neck. The rings freely move about the neck to contact one or more of each other, the connector, and the main body.

In some embodiments, the lure further comprises one or more hooks. The term "hook" broadly refers to any pointed and/or barbed instrument used to catch fish.

In some embodiments, the lure further comprises a skirt releasably or permanently attached to the second end of the connector.

In some embodiments, the fishing lure further comprises at least one aperture pair connected by a tunnel positioned within an interior of the lure. In some embodiments, the at least one aperture pair comprises a first aperture positioned at the first end of the main body and a second aperture positioned at the second end of the main body; a first aperture positioned at the first end of the main body and a second aperture positioned at the second end of the neck; or combinations thereof.

In some embodiments, at least one of the main body, connector, or neck is formed from metal, polymeric material, ceramic material, or combinations thereof. In some embodiments, the metal is selected from steel, stainless steel, brass, lead, copper, aluminum, or combinations thereof.

In some embodiments, the lure further comprises a corrosion-resistant coating.

In some embodiments, the first end of the main body is tapered or rounded.

In some embodiments, the neck is releasably attached to the connector, main body, or both.

In some embodiments, at least one of the main body, neck, and connector have a round or oval cross-sectional shape.

In some embodiments, the main body is bullet-shaped.

In some embodiments, the lure comprises 1-10, 1-5, or 1-3 rings.

In some embodiments, the presently disclosed subject matter is directed to a method of making a fishing lure. The method comprises forming a main body, connector, and neck, each comprising an external diameter, a first end, and a second end. The method further includes forming one or more rings comprising a central aperture with a diameter. The method comprises positioning the one or more rings about the exterior surface of the neck. The method comprises joining the first end of the neck to the second end of the main body and joining the first end of the connector to the second end of the neck, wherein the rings are maintained on the neck. In some embodiments, the method comprises forming at least one aperture pair connected by a tunnel positioned within an interior of the lure, wherein the at least one aperture pair comprises a first aperture positioned at the first end of the main body and a second aperture positioned at the second end of the main body; a first aperture positioned at the first end of the main body and a second aperture positioned at the second end of the neck; or combinations thereof. In some embodiments, forming of at least one aperture pair is optional. The method optionally includes forming at least one aperture in the main body and printing or coating an exterior surface of the fishing lure with a design or color. The central aperture diameter of each ring is greater than the external diameter of the neck, and smaller than the external diameter of the main body and connector. The rings freely move about the neck to make noise as they contact each other, the connector, and the main body.

In some embodiments, the method further comprises attaching a skirt to the second end of the connector.

In some embodiments, the joining is selected from welding, adhesive, screws, bolts, hooks, snap-fit arrangement, screw-fit arrangement, press-fit arrangement, or combinations thereof.

In some embodiments, 1-10 rings are positioned about the exterior surface of the neck.

In some embodiments, at least one of the main body, neck, and connector have a round or oval cross-sectional shape.

In some embodiments, the method further comprises applying a corrosion-resistant coating to the lure.

In some embodiments, at least one of the main body, connector, or neck is formed from metal, polymeric material, ceramic material, or combinations thereof.

BRIEF DESCRIPTION OF THE DRAWINGS

FIG. 2b is an exploded view of the lure head of FIG. 2a.

DETAILED DESCRIPTION

Figure 1:
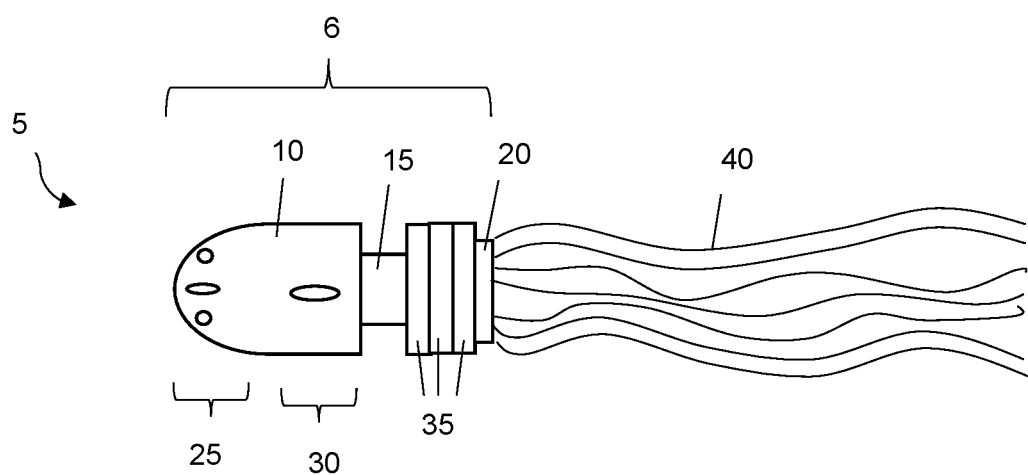
FIG. 1 is a side plan view of a fishing lure in accordance with some embodiments of the presently disclosed subject matter.

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The presently disclosed subject matter is generally directed to a fishing lure for use in attracting and catching fish. The term "fishing lure" or "lure" broadly refers to an artificial bait used to catch fish. FIG. 1 illustrates one embodiment of lure 5. As shown, the lure includes lure head 6 defined by body 10, neck 15 (comprising one or more rings 35), and connector 20. The body includes rounded first end 25 that allows the lure to easily move through the water (e.g., such as when used during trolling). Second end 30 of the body is operably connected to neck 15. The neck houses one or more rings 35 that circumferentially surround the neck. As set forth in more detail herein below, the rings make noise as the lure moves through the water. Skirt 40 attaches to connector 20 and provides an additional attraction for fish. The lure is designed to entice fish by sight and/or sound senses.

Figure 2A:
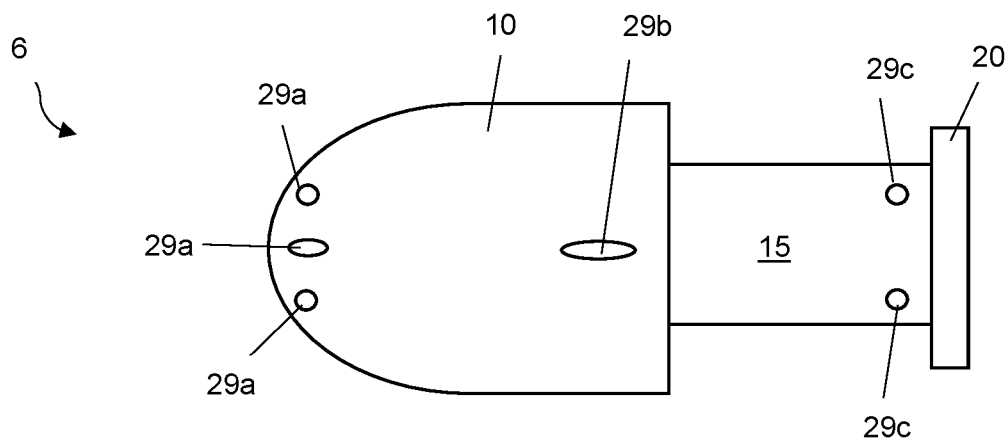
FIG. 2a is a side plan view of a lure head in accordance with some embodiments of the presently disclosed subject matter.
Figure 2B:
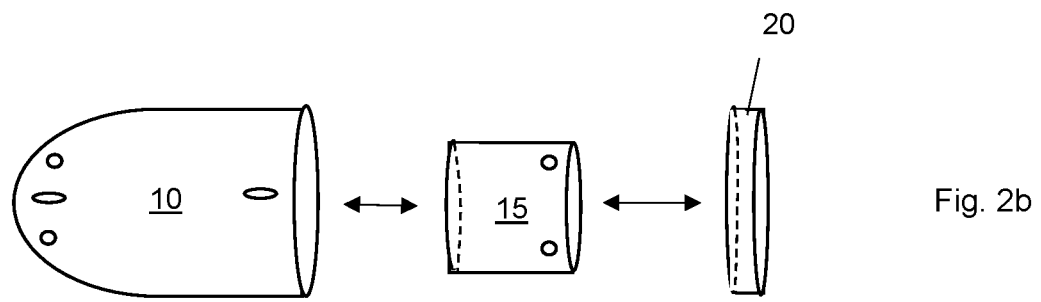

FIGS. 2a and 2b illustrate one embodiment of lure head 6 configured without rings 35 to show detail. As illustrated, the lure head comprises main body 10 and connector 20 joined via neck 15. The main body includes one or more optional aperture pairs 29a-29b and/or 29a-29c that aid in movement of the lure through the water, help to cause movement of rings 35, and/or produce a smoke trail (e.g., a stream of tiny bubbles). Particularly, main body 10 can include one or more apertures 29a positioned at first end 25. In some embodiments, 1-10 apertures 29a are configured on the first end of the main body, although any desired number of apertures can be used. In some embodiments, each aperture 29a is paired to a second aperture (29b or 29c) and each aperture pair is connected together via a tunnel internal to the main body and/or neck of the lure. For example, one aperture 29a can pair with a corresponding aperture 29b positioned at the second end of the main body. In some embodiments, one aperture 29a can pair with a corresponding aperture 29c positioned at the second end of neck 15, as described below.

Figure 2C:
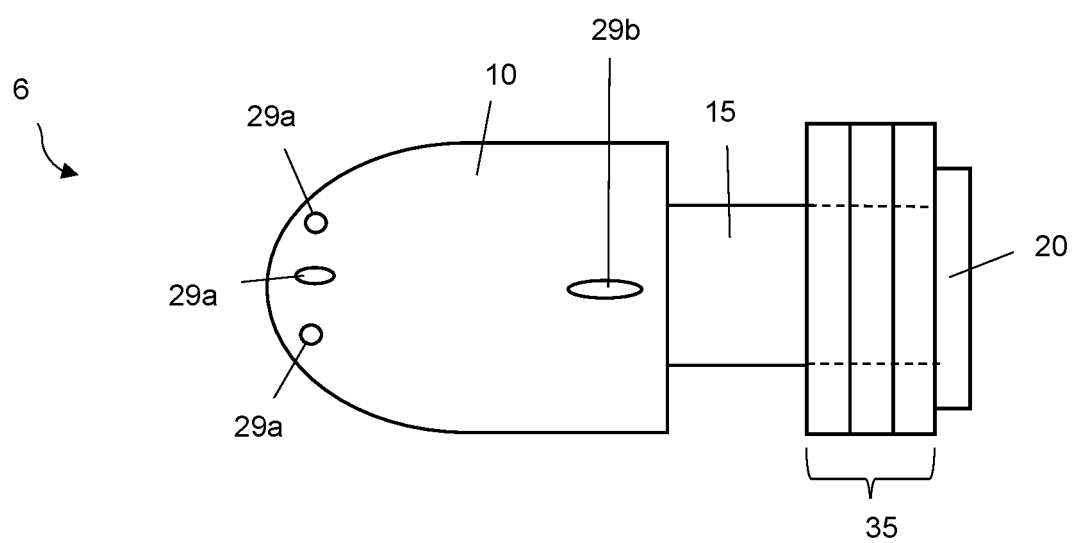
FIG. 2c is a side plan view of the lure head of FIG. 2a comprising a plurality of rings in accordance with some embodiments of the presently disclosed subject matter.

The neck is sized and shaped to house a plurality of rings 35, as shown in FIG. 2c. Connector 20 functions to retain the rings on neck 15 and provides an attachment for skirt 40.

Figure 3A:
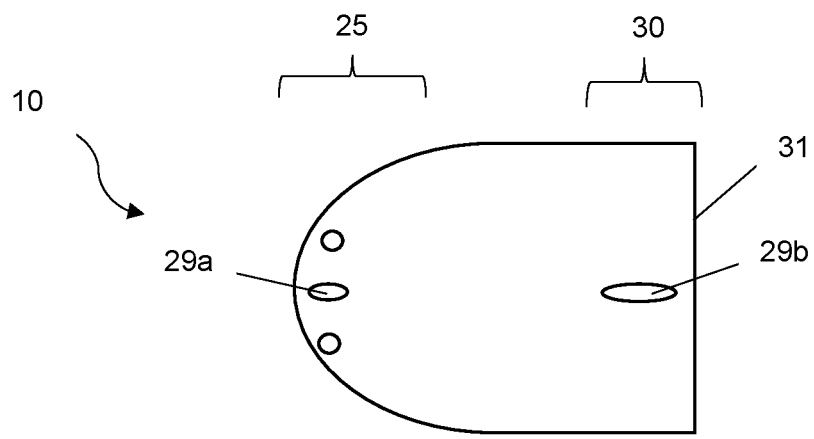
FIG. 3a is a side plan view of a lure head main body in accordance with some embodiments of the presently disclosed subject matter.
Figure 3B:
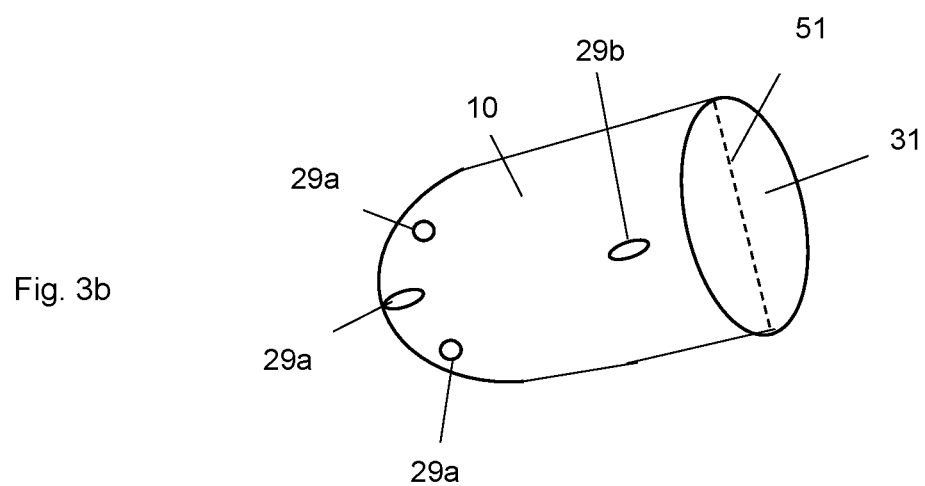
FIG. 3b is a perspective view of a lure head main body in accordance with some embodiments of the presently disclosed subject matter.
Figure 3C:
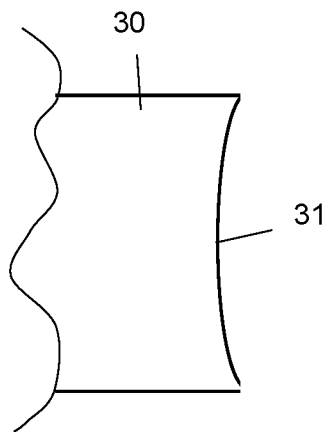
FIGS. 3c and 3d illustrate alternate embodiments of lure main body faces in accordance with some embodiments of the presently disclosed subject matter.
Figure 3D:
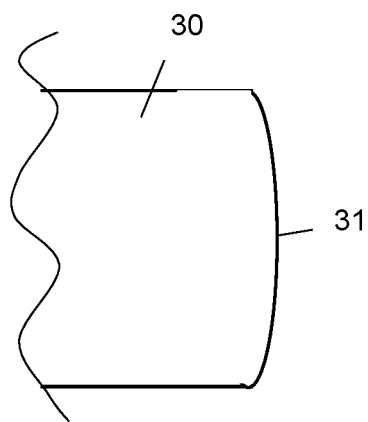

FIGS. 3a and 3b illustrate one embodiment of main body 10. The main body includes first end 25 that can be tapered or curved in shape. The tapered or curved shape gives the lure a streamlined profile that allows for easy movement through the water. In some embodiments, main body 10 can be bullet-shaped (with a rounded or tapered nose and a relatively flat rear), although any desired shape can be used (e.g., oval, rectangle, and the like). Second end 30 can include face 31 that operably connects to neck 15. In some embodiments, face 31 can be approximately vertically oriented. However, it should be appreciated that the main body is not limited and face 31 can be constructed in a wide variety of conformations, including (but not limited to) the curved embodiments of FIGS. 3c and 3d. The main body includes outer diameter 51, as shown in FIG. 3b. The term "diameter" refers to the distance of a straight-line segment passing through the center of an object, segment, or face. The outer diameter of the main body (e.g., second end 30) is greater than the corresponding outer diameter of neck 15.

Figure 3E:
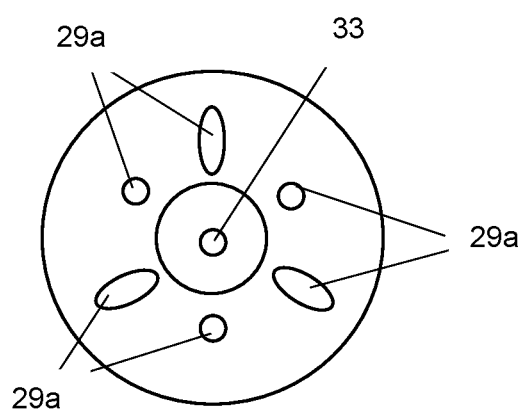
FIG. 3e is a front plan view of a lure main body in accordance with some embodiments of the presently disclosed subject matter.
Figure 3F:
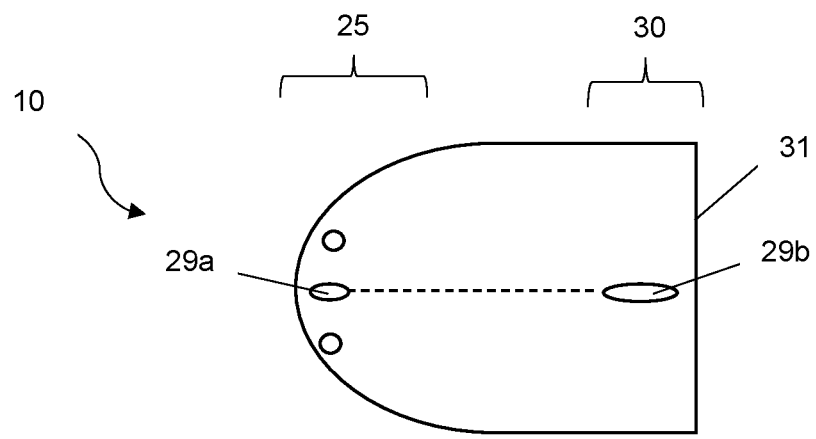
FIG. 3f is a side plan view of a lure main body in accordance with some embodiments of the presently disclosed subject matter.
Figure 3G:
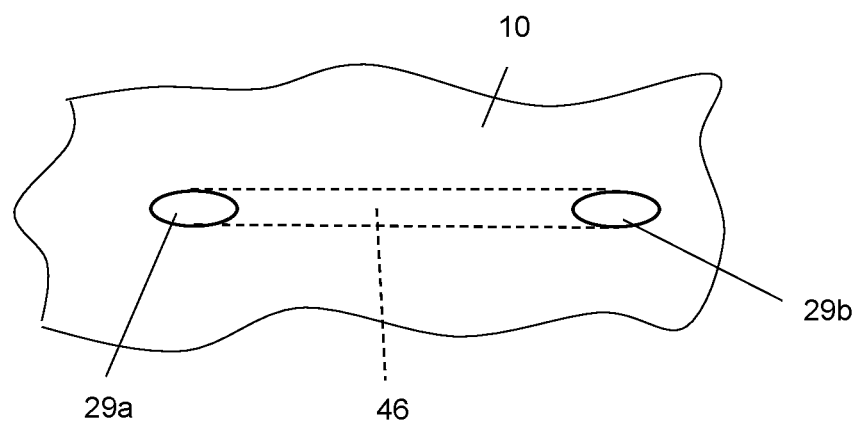
FIG. 3g is a fragmentary view of a lure main body with a channeled aperture in accordance with some embodiments of the presently disclosed subject matter.

As shown in FIG. 3e, the main body optionally includes one or more apertures 29a positioned about first end 25 that make up part of an aperture pair. The main body further optionally includes one or more apertures 29b positioned about second end 30 of the main body. The term "aperture" refers to any type of opening, such as a hole, gap, slit, tunnel, or cleft in any form or shape. In some embodiments, an aperture pair can be aligned (e.g., apertures 29a and 29b of FIG. 3f). In some embodiments, "aligned" refers to the orientation of two or more objects in the same directional plane (e.g., in the same axial direction and/or radial direction). Aligned aperture pair 29a and 29b can be connected within the interior main body via internal tunnel 46, as illustrated in FIG. 3g. Alternatively, one or more apertures 29a can pair with corresponding apertures in neck 15, as described below. The apertures can be configured in any desired size and/or shape. Alternatively, the apertures can all have about the same size and/or shape. It should further be appreciated that individual apertures can differ from each other (e.g., a first aperture 29a can differ in size/shape from a second aperture 29a).

As shown in FIG. 3e, the first end of main body 10 can optionally include axial bore 33 extending therethrough to receive a pulling element. For example, in some embodiments, the axial bore can receive an elongated screw via threading. The screw can be attached to a line that pulls the lure through the water during use. It should be appreciated that the presently disclosed subject matter is not limited, and any device that can releasably or permanently attach to axial bore 33 through any known mechanism (e.g., screw fit, snap fit, pins, bolts, welding, adhesive, etc.) can be used.

Figure 4A:
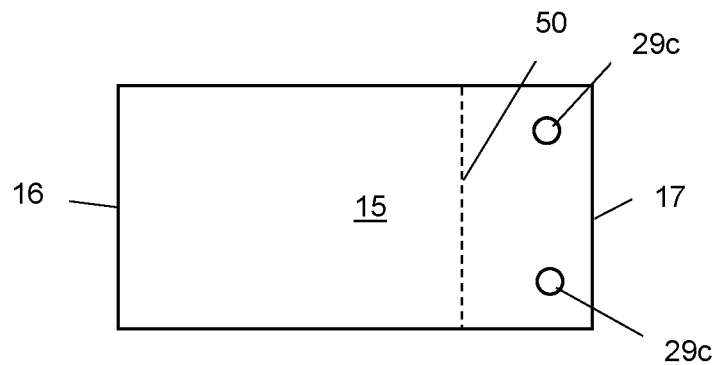
FIG. 4a is a side plan view of a lure neck in accordance with some embodiments of the presently disclosed subject matter.

FIG. 4a illustrates one embodiment of neck 15 comprising first end 16 and second end 17. As used herein, the term "neck" broadly refers to an element that spans the distance between the main body and the connector and provides an attachment for rings 35. First end 16 is operably connected to second end 30 of the main body, and second end 17 is operably connected to a first end of the connector, using any known mechanism. Neck 15 has outer diameter 50 configured to be less than main body outer diameter 51. In some embodiments, the neck diameter is about 5-99 percent smaller than the diameter of main body face 31. Thus, neck diameter 50 can be at least about (or no more than about) 5, 10, 15, 20, 25, 30, 35, 40, 45, 50, 55, 60, 65, 70, 75, 80, 85, 90, 95, or 99 percent smaller than the diameter of the corresponding main body face. However, it should be appreciated that neck 15 can be configured with a diameter outside the range set forth above.

Figure 4B:
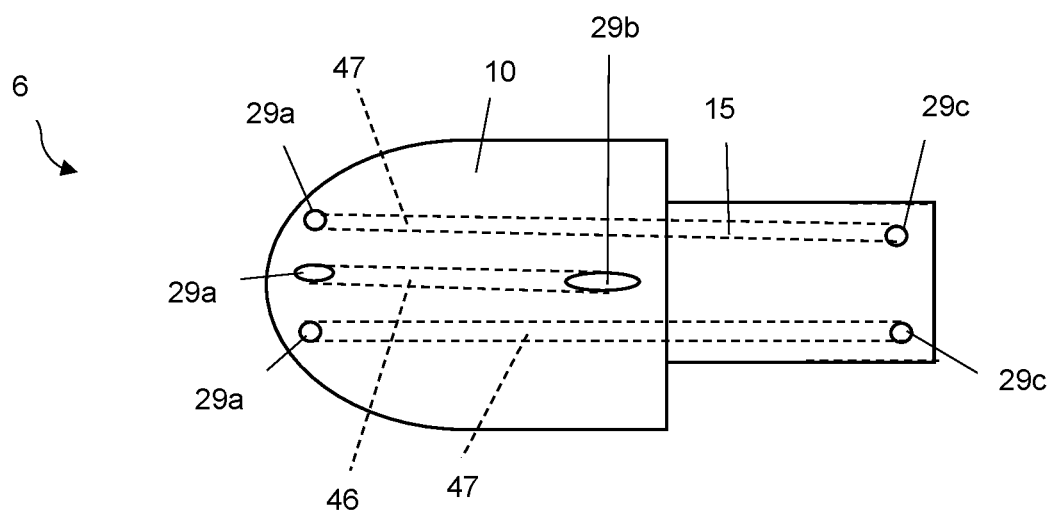
FIG. 4b is a side plan view of a lure main body and neck in accordance with some embodiments of the presently disclosed subject matter.

Neck 15 can optionally include one or more apertures positioned at any neck location (e.g., first neck end 16, second neck end 17, or anywhere in between). For example, in some embodiments, the neck can include one or more apertures 29c that each align with a corresponding aperture 29a on the first end of main body 10. As shown in FIG. 4b, at least one pair of aligned apertures can be connected within the interior of the lure via internal tunnel 46 and/or 47. Particularly, tunnel 47 spans an interior distance between aperture 29a positioned at the first end of the main body to aperture 29c positioned at the second end of neck 15. Thus, in some embodiments, the lure apertures are configured in pairs, each with a first aperture on the first end of the main body and a second aperture either on the second end of the main body or on the second end of neck 15. Each aperture pair is connected via an internal tunnel.

In some embodiments, the neck can be configured to be approximately cylindrically shaped, although the neck can have any desired cross-sectional shape (e.g., square, oval, rectangular, triangular, abstract, heart-shaped, and the like).

Figure 4C:
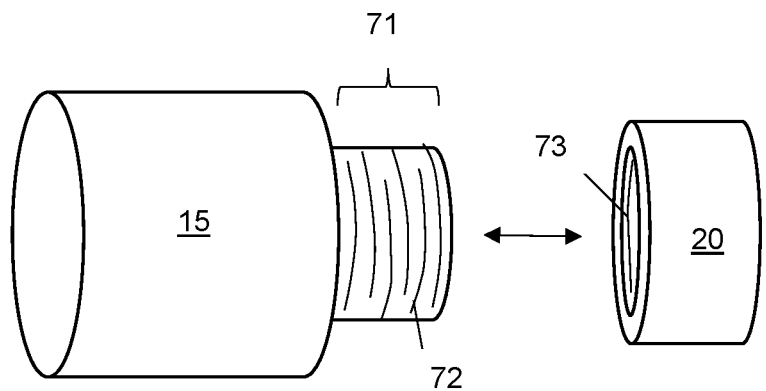
FIG. 4c is a side plan view of a lure neck and connector in accordance with some embodiments of the presently disclosed subject matter.

In some embodiments, second end 17 of the neck can include one or more attachments to allow the neck to releasably join with connector 20. One embodiment of attachment 71 is illustrated in FIG. 4c. As shown, the attachment can be configured as a plurality of screw threads 72 that cooperate with corresponding grooves 73 positioned within the interior of the connector. "Screw threads" refers to one or more indentations and/or protuberances on the exterior surface of the attachment that are complimentary to corresponding indentations and/or protuberances on the first end/interior of the connector. In this way, the connector can be releasably attached to the neck. Specifically, the screw threads bring the neck and connector together when one member is torsionally rotated, forming a seal when the screw threads are fully engaged. It should be appreciated that the presently disclosed subject matter is not limited to attachments with screw threads, and any known element that provides releasable attachment can be used (e.g., snap fit and the like). It should further be appreciated that neck 15 can be constructed without attachment 71. In some embodiments, attachment 71 can be positioned on first end 16 or second end 17 of the neck and/or on second end 30 of the main body and/or on the first end of connector 20 to allow for releasable connection and attachment of various lure elements.

Figure 5A:
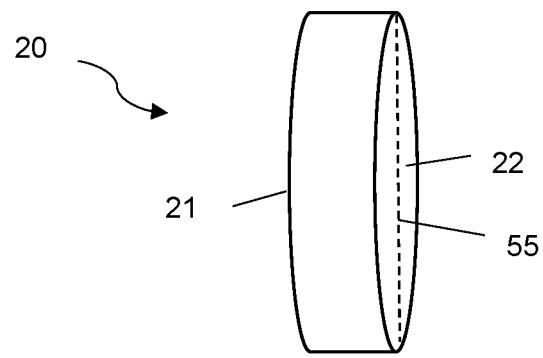
FIG. 5a is a perspective view of a lure connector in accordance with some embodiments of the presently disclosed subject matter.

FIG. 5a illustrates one embodiment of connector 20 comprising first end 21 and second end 22. The first end is operably connected to second end 17 of the neck. The connector second end permanently or releasably attaches to skirt 40. The connector has outer diameter 55 that is greater than outer diameter 50 of neck 15 to ensure that rings 35 are maintained on the neck. Connector diameter 55 can be larger than neck diameter 50 by about 5-100 percent. Thus, diameter 55 can be greater than diameter 50 by at least about (or no more than about) 5, 10, 15, 20, 25, 30, 35, 40, 45, 50, 55, 60, 65, 70, 75, 80, 85, 90, 95, or 100 percent. It should be appreciated that the difference in diameters 50, 55 can be greater (e.g., 150, 200, 300, 500 percent or more) or less (4, 3, 2, 1, 0.5. percent or less) than the range set forth above.

Figure 5B:
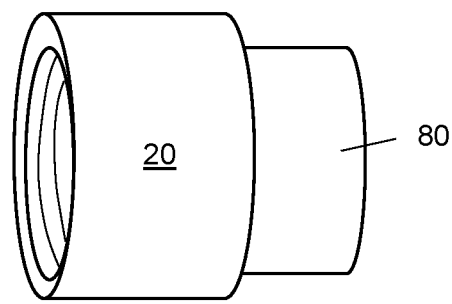
FIG. 5b is a perspective view of a lure connector in accordance with some embodiments of the presently disclosed subject matter.

In some embodiments, the second end of the connector includes extension 80 that allows for easy attachment of skirt 40, as illustrated in FIG. 5b. However, the extension is optional and the connector can be configured in any known shape.

Figure 5C:
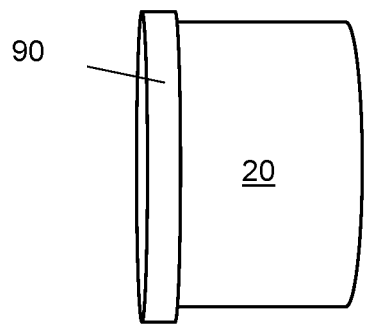
FIG. 5c is a perspective view of a lure connector comprising a lip in accordance with some embodiments of the presently disclosed subject matter.

In some embodiments, the first end of connector 20 can include lip 90. The lip can have an external diameter greater than the remainder of the connector, as shown in FIG. 5c. However, it should be appreciated that lip 90 is optional.

The main body, neck, and connector can each have a circular cross-sectional shape. Alternatively, the main body can have an oval, square, rectangular, triangular, pentagonal, heptagonal, hexagonal, octagonal, or abstract shape. It should be appreciated that the cross-sectional shapes of the main body, neck, and connector are not limited and can be configured in any desired shape. In some embodiments, the cross-sectional shape of one component of the lure head can differ from another (e.g., the main body can have an oval cross-sectional shape, while the neck has a round cross-sectional shape). Alternatively, in some embodiments all the components have the same cross-sectional shape.

In some embodiments, the main body, neck, and/or connector are hollow in construction (e.g., having an internal cavity). Alternatively, one or more of the cited components can be solid (e.g., constructed without an internal cavity) to add weight to the lure.

Lure head 6 can be constructed from any desired rigid material. The term "rigid material" refers to any material that does not readily bend under pressure (e.g., is not flexible). Suitable rigid materials can therefore include (but are not limited to) metal (e.g., stainless steel, steel, lead, brass, aluminum, copper), plastic, stone, ceramic material, and combinations thereof. In some embodiments, the lure can be constructed from one or more corrosion-resistant materials and/or can include a corrosion-resistant coating. The term "corrosion-resistant" refers to the ability of a material to resist corrosion when compared to other similar materials.

Figure 6A:
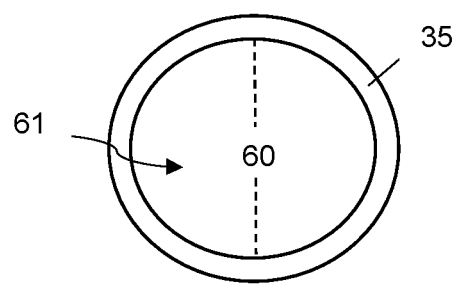
FIG. 6a is a front plan view of a lure ring in accordance with some embodiments of the presently disclosed subject matter.
Figure 6B:
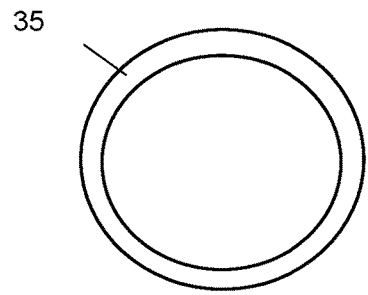
FIGS. 6b-6j are front plan views of several embodiments of lure rings that can be used with the disclosed lure.
Figure 6C:
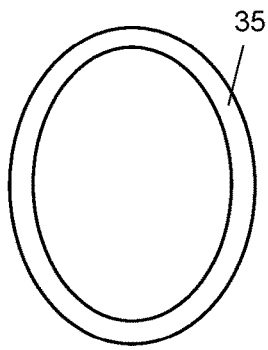
Figure 6D:
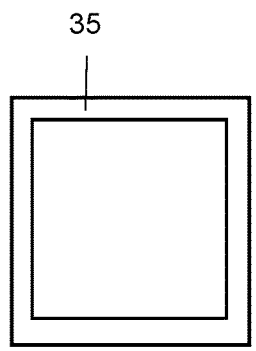
Figure 6E:
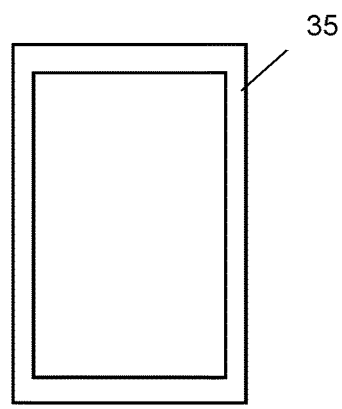
Figure 6F:
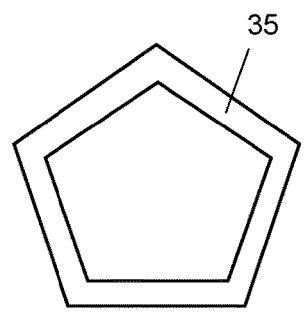
Figure 6G:
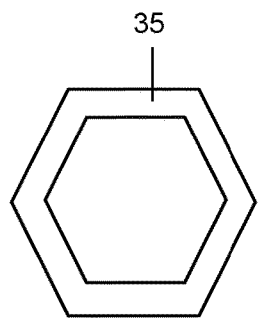
Figure 6H:
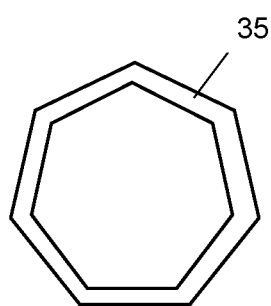
Figure 6I:
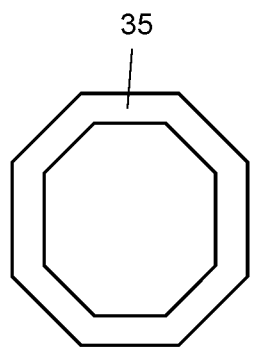
Figure 6J:
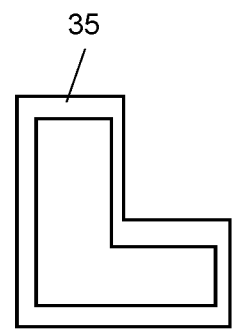

As described above, neck 15 houses one or more rings 35. The term "ring" includes any generally closed structure. FIG. 6a illustrates one embodiment of ring 35 comprising central aperture 61 with diameter 60. Diameter 60 is greater than the outer diameter of neck 15 to ensure that the rings remain configured around the outer surface of the neck. Thus, when assembled, the neck passes through ring aperture 61. Further, internal ring diameter 60 is smaller than both main body and connector outer diameters 51, 55. In this way, the rings are maintained on neck 15 and cannot be inadvertently separated from the neck. Further, the difference between the inner ring diameter and outer neck diameter is configured such that rings 35 are free to move laterally and transversely about neck 15.

Lure 5 can include any desired number of rings, such as (but not limited to) 1-10 (e.g., 1, 2, 3, 4, 5, 6, 7, 8, 9, or 10). However, the presently disclosed subject matter is not limited and the lure can include any desired number of rings (e.g., 1-50 or more).

Rings 35 can have any desired cross-sectional shape. For example, as illustrated in FIG. 6b-6j, the rings can be configured to be circular, oval, square, rectangular, pentagonal, hexagonal, heptagonal, octagonal, or abstract in shape. However, the presently disclosed subject matter is not limited and each ring can be constructed in any desired shape. In some embodiments, each ring is configured in about the same size and/or shape. However, the presently disclosed subject matter also includes embodiments wherein a particular ring differs in size and/or shape from one or more other rings.

The rings can be constructed to be hollow or solid, as desired by the user. In some embodiments, a variety of rings can be used (solid and hollow) to produce a variety of sounds.

Rings 35 can be constructed from any desired rigid material, such as (but not limited to) metal (e.g., stainless steel, brass, copper, aluminum, steel), plastic, stone, and the like. As such, when the rings contact with each other, the connector, and/or the main body, an impact-type noise is generated.

In some embodiments, the lure can be at least partially disassembled to allow the rings to be mixed and matched as desired by the user. For example, in some embodiments, the neck can be unscrewed or otherwise unattached from the connector and/or main body to allow rings 35 to be added or removed. In this way, a set of stainless steel rings can be replaced by a set of brass rings depending on the particular fishing location and setting. Similarly, the number of rings can be altered in the same way when a louder or softer noise is desired.

Skirt 40 is optionally attached to connector 20, covering a least a portion thereof. The term "skirt" broadly refers to any elongated, flowing, or decorative element that can be attached to connector 20 for use in attracting fish. In some embodiments, the skirt interacts with extension 80 to provide a secure connection. The skirt extends rearwardly from lure head 6. The skirt is typically constructed from a flexible material (tail) that is injection molded or otherwise shaped as desired by the user. The term "flexible" refers to a material that easily bends and/or changes shape. In some embodiments, the skirt can include a plurality of strands (e.g., 1-100). It will be appreciated that a wide variety of skirt compositions, colors, and lengths can be provided and used. For example, multiple strands of rubber, cloth, silicone, feathers, plastic, nylon, hair, and the like can be secured to the connector to serve as the skirt according to methods well known in the art. The length of skirt 40 can vary as desired. In some embodiments, the skirt thus is designed to conceal a hook and/or attract fish.

The skirt is typically flexible so that it can move as the lure passes through the water. The wiggling of the skirt can imitate a fish food source, such as a worm, minnow, small fish, and the like. The wiggling motion tends to make the lure appear to be alive to the fish. The skirt can also include a multitude of designs such as stripes, fringes, ruffles, sparkles, glitter, and the like in a wide variety of colors to improve the attractiveness of the lure to fish.

It should be appreciated that in some embodiments, the disclosed lure can be configured without skirt 40. In such embodiments, the lure is defined by main body 10, neck 15, rings 35, and connector 20.

In some embodiments, the exterior surface of the lure head can optionally be coated with one or more materials that affect characteristics such as color, durability, water resistance, and the like. Such materials are well known in the art. For example, epoxy can be used as a protective coating, providing durability and a smooth finish. Further, the exterior surface of all or a portion of the lure head can be coated with paint or glitter in any pattern (e.g., painted with eyes, scales, fins, and the like to attract fish). It should therefore be appreciated that the exterior surface of the lure head can be configured in any desired colors or patterns.

The disclosed lure can optionally include an element for attaching a fishing line and/or a hook. Such elements are well known in the art.

Figure 7:
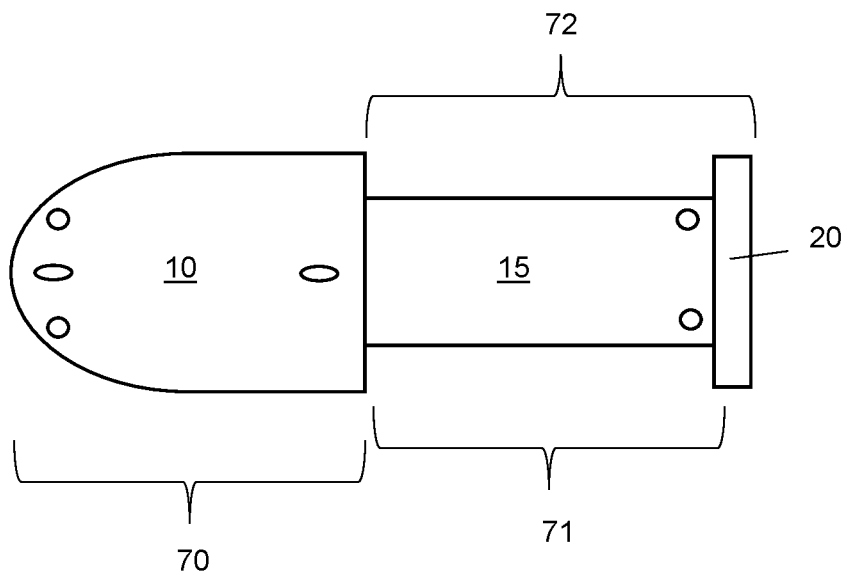
FIG. 7 is a side plan view of a lure head in accordance with some embodiments of the presently disclosed subject matter.

Lure 5 can be configured in a wide variety of sizes (such as with a length of about 1 inch or less to about 12 inches or more). However, the presently disclosed subject matter is not limited to the ranges set forth above. In some embodiments, length 70 of main body 10 is about the same as the neck length 71, as shown in FIG. 7. The term "length" as used herein refers to the longest dimension in the longitudinal direction. Alternatively, the length of the main body can be about the same as combined length 72 of the neck and connector. However, the presently disclosed subject matter is not limited and main body 10 can be configured with length 70 about 1, 5, 10, 15, 20, 25, 30, 35, 40, 45, 50, 55, 60, 65, 70, 75, 80, 85, 90, 95, 100 percent smaller or larger than the length of neck 20 and/or the combination of the neck and connector length 72.

The weight of the lure can be determined at least in part by the size and shape, the materials of construction, and the number of rings 35 positioned on neck 15. The weight of lure 5 can therefore range from about 0.5 ounces to about 10 pounds. However, the presently disclosed subject matter is not limited to the range set forth above, and the lure can weight less or more than recited herein.

In some embodiments, lure head 6 can be constructed as a single piece using machining, casting, and other methods known in the art. Alternatively, one or more elements of the lure head can be releasably or permanently joined together through the use of welding, adhesive, mechanical closures (e.g., screws, bolts, pins), and/or fitting arrangements (snap-fit, screw-fit, and the like). The releasable attachment is capable of repeated removal and joining, while a permanent attachment remains attached.

Figure 8:
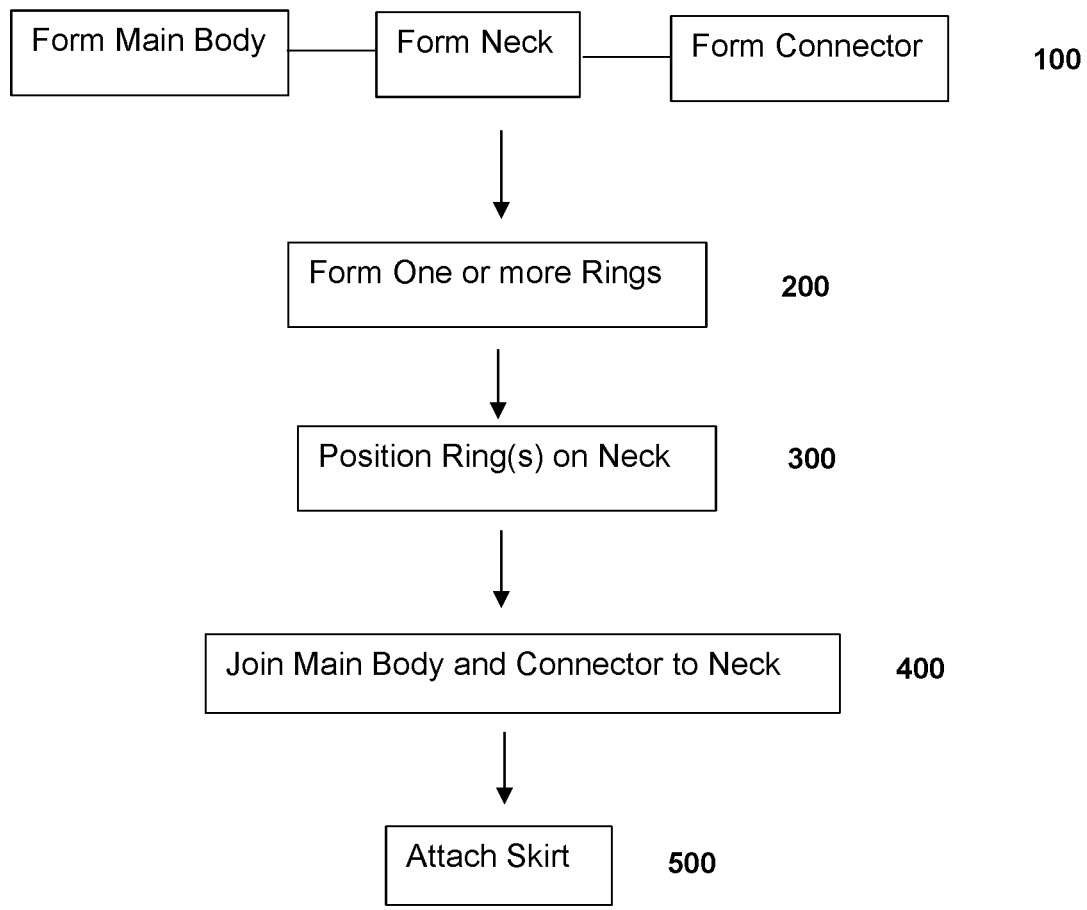
FIG. 8 is a schematic of one method of making a fishing lure in accordance with some embodiments of the presently disclosed subject matter.

FIG. 8 illustrates one method of constructing lure 5. Particularly, the main body, neck, and connector are formed at step 100. The main body, neck, and connector can each be formed independently of the other parts. Alternatively, one or more parts can be formed together (e.g., the main body and neck can be formed as a single piece). In some embodiments, the main body, neck, and connector can be formed as a single piece. Any known method of forming the parts can be used, such as metal fabrication, extrusion, molding, and the like. Similarly, at step 200, one or more rings are formed using any known method. The rings are sized and shaped such that the central ring aperture can accomodate the outer circumference of neck 15 with enough clearance to allow the rings to freely move about the neck.

At step 300, the rings are positioned around the external surface of the neck. Specifically, at least a portion of the neck is housed within the ring central aperture. At step 400, the main body and connector are joined to each end of neck 15. In this way, rings 35 are maintained on the neck. The main body and/or connector can be permanently or releasably attached to the neck. For example, in some embodiments, the main body and/or connector can be attached to the neck via welding or adhesive connection. Alternatively, the main body and/or connector can be releasably attached to the neck using screws, clips, bolts, hooks, and the like. In some embodiments, the releasable connection can be accomplished through a snap-fit connection, screw-fit connection, press-fit connection, and the like.

The term "snap-fit" refers to an attachment wherein one element has one or more protrusions that fit into one or more corresponding indentations on a second element, such that the protrusions "snap" into the indentations to join the two elements together. The term "screw-fit" refers to refers to an attachment wherein one element has helical or advancing spiral threads and a second element has helical grooves of the same size and/or number of the threads, such that the two elements can be reversibly joined by twisting into place. The term "press-fit" refers to an interference fit, wherein two elements are attached to each other via frictional forces and can involve deformation of one or more of the elements.

FIG. 8 can also include one or more optional steps (not shown), such as the formation of apertures 29 in the main body and/or neck. The apertures can be formed using any known method, such as drilling, laser cutting, boring, and the like. Further, one or more coatings (e.g., corrosion-resistant materials, paint, glitter, and the like) can be applied to one or more portions of the lure head. As indicated in step 500, skirt 40 can optionally be attached to the second end of connector 20.

It should be appreciated that the steps of FIG. 8 can be performed in any order and are not limited to the order shown.

In use, lure head 6 comprising main body 10, rings 35 configured around neck 15, and connector 20 can be releasably or permanently attached to skirt 40 using methods well known in the art. Alternatively, the lure can be assembled without skirt 40. As the lure is pulled through the water, the movement of the water causes the rings to move and strike against each other and/or against the lure connector and main body. In some embodiments, a smoke trail is produced by aperture pair 29a and 29b, providing additional ring movement (e.g., the trail of bubbles contacts the rings, further promoting ring movement). In some embodiments, a steam of water and/or bubbles are produced by aperture pair 29a and 29c (e.g., the rings are moved by the water stream exiting tunnel 47). As the rings collide, a sound is generated to attract the attention of nearby fish and entice the fish to bite the fishing lure. Thus, as the lure moves through the water, the rings produce a steady clanging or rattling noise due to the air and/or water exiting tunnels 47, 46, the repeated contact with surrounding rings, and/or contact with main body 10 and/or connector 20. As a result, sound waves radiate from the lure, attracting fish.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A fishing lure comprising:
   a main body defined by an external diameter, a first end, and a second end;
   a connector configured for attachment of a lure skirt, the connector defined by an external diameter, a first end, and a second end;
   a neck defined by an external diameter, a first end, and a second end, wherein the neck first end is operably joined to the second end of the main body, and wherein the neck second end is operably joined to the first end of the connector;
   one or more rings positioned about the external diameter of the neck, wherein each ring is defined by:
      a central aperture with a diameter that is greater than the external diameter of the neck, and less than the external diameter of the main body and the connector such that the rings are maintained on the neck;
   at least one aperture pair defined by a first aperture positioned at the first end of the main body and a second aperture positioned at the second end of the neck adjacent to the one or more rings, wherein the first and second apertures are connected by a tunnel positioned within the interior of the lure; and
   wherein the rings freely move about the neck to contact one or more of each other, the connector, and the main body; and
   wherein each second aperture is configured as an exit, allowing water and air bubbles that pass through the interior tunnel to contact the one or more rings, promoting ring movement.

2. The fishing lure of claim 1, further comprising one or more hooks.

3. The fishing lure of claim 1, further comprising a skirt releasably or permanently attached to the second end of the connector.

4. The fishing lure of claim 1, wherein at least one of the main body, connector, or neck is formed from metal, polymeric material, ceramic material, or combinations thereof.

5. The fishing lure of claim 4, wherein the metal is selected from steel, stainless steel, brass, lead, copper, aluminum, or combinations thereof.

6. The fishing lure of claim 1, further comprising a corrosion-resistant coating.

7. The fishing lure of claim 1, wherein the first end of the main body is tapered or rounded.

8. The fishing lure of claim 1, wherein the neck is releasably attached to the connector, main body, or both.

9. The fishing lure of claim 1, wherein at least one of the main body, neck, and connector have a round or oval cross-sectional shape.

10. The fishing lure of claim 1, wherein the main body is bullet-shaped.

11. The fishing lure of claim 1, comprising 1-10 rings.

12. The fishing lure of claim 1, wherein the neck is defined by a length that spans the distance from the first end to the second end, wherein the external diameter along the length of the neck is uniform.

13. The fishing lure of claim 1, further comprising a third aperture positioned at the first end of the main body and a fourth aperture positioned at the second end of the main body, connected together through a tunnel housed within the interior of the main body.

14. A method of making a fishing lure, the method comprising:
   forming a main body, connector, and neck, each comprising an external diameter, a first end, and a second end;
   forming one or more rings comprising a central aperture with a diameter;
   positioning the one or more rings about the exterior surface of the neck;
   joining the first end of the neck to the second end of the main body;
   joining the first end of the connector to the second end of the neck, wherein the rings are maintained on the neck;
   forming at least one aperture pair connected by a tunnel positioned within an interior of the lure, the at least one aperture pair comprising:
      a first aperture positioned at the first end of the main body and a second aperture positioned at the second end of the neck adjacent to the one or more rings; and
   optionally printing or coating an exterior surface of the fishing lure with a design or color;
   wherein the central aperture diameter of each ring is greater than the external diameter of the neck, and smaller than the external diameter of the main body and connector;
   wherein the one or more rings freely move about the neck to make noise as they contact each other, the connector, and the main body; and
   wherein each second aperture is configured as an exit, allowing water and air bubbles that pass through the interior tunnel to contact the one or more rings, promoting ring movement.

15. The method of claim 14, further comprising attaching a skirt to the second end of the connector.

16. The method of claim 14, wherein the joining of the first end of the neck to the second end of the main body, the joining of the first end of the connector to the second end of the neck, or both are selected from welding, adhesive, screws, bolts, hooks, snap-fit arrangement, screw-fit arrangement, press-fit arrangement, or combinations thereof.

17. The method of claim 14, wherein 1-10 rings are positioned about the exterior surface of the neck.

18. The method of claim 17, wherein at least one of the main body, neck, and connector have a round or oval cross-sectional shape.

19. The method of claim 14, further comprising applying a corrosion-resistant coating.

20. The method of claim 14, wherein at least one of the main body, connector, or neck is formed from metal, polymeric material, ceramic material, or combinations thereof.

* * * * *